US010565723B2

(12) United States Patent
Peri

(10) Patent No.: US 10,565,723 B2
(45) Date of Patent: Feb. 18, 2020

(54) SYSTEMS AND METHODS FOR DRIFT CORRECTION

(71) Applicant: Christopher A. Peri, Mountain View, CA (US)

(72) Inventor: Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 15/421,824

(22) Filed: Feb. 1, 2017

(65) Prior Publication Data

US 2017/0221225 A1 Aug. 3, 2017

Related U.S. Application Data

(60) Provisional application No. 62/290,253, filed on Feb. 2, 2016.

(51) Int. Cl.
*G06T 7/73* (2017.01)
*G06T 7/246* (2017.01)
(Continued)

(52) U.S. Cl.
CPC ............ *G06T 7/73* (2017.01); *G06K 9/00335* (2013.01); *G06K 9/00671* (2013.01);
(Continued)

(58) Field of Classification Search
CPC .......... G06T 7/73; G06T 19/006; G01C 21/06
See application file for complete search history.

(56) References Cited

U.S. PATENT DOCUMENTS 7,315,635 B2 1/2008 Oosawa
7,627,197 B2 12/2009 Aoyama
(Continued)

FOREIGN PATENT DOCUMENTS

EP 2630447 8/2013
WO WO 2015126443 8/2015

OTHER PUBLICATIONS

Changyu He, et al., An Inertial and Optical Sensor Fusion Approach for Six Degree-of-Freedom Pose Estimation, Sensors, 2015.
(Continued)

*Primary Examiner* — Jamie J Atala
*Assistant Examiner* — Michael Robert Cammarata
(74) *Attorney, Agent, or Firm* — John King

(57) ABSTRACT

A method, device, and non-transitory computer-readable storage medium having data stored therein to correct for drift in an electronic device is described. Embodiments comprise determining a first center pose of the electronic device. Then, tracking, using a sensor in conjunction with computer vision operating on a processor, at least one key point within a scene when the first center pose is within a tolerance with respect to a reported center pose. Determining a derived center pose based upon the first center pose and the at least one key point. Disabling the sensor for a predetermined time. After the predetermined time, determining whether a second center pose is within the tolerance with respect to the derived center pose. Using the sensor, tracking the at least one key point when the second center pose is within the tolerance with respect to the derived center pose. Adjusting the second center pose when there is a difference between the second center pose and the derived center pose.

25 Claims, 5 Drawing Sheets

(51) Int. Cl.
  *G06K 9/03* (2006.01)
  *G06K 9/00* (2006.01)
  *G06K 9/22* (2006.01)
  *G06K 9/62* (2006.01)

(52) U.S. Cl.
  CPC ............. *G06K 9/036* (2013.01); *G06K 9/22* (2013.01); *G06K 9/6215* (2013.01); *G06K 9/6289* (2013.01); *G06T 7/246* (2017.01)

(56) References Cited

U.S. PATENT DOCUMENTS

| | | | |
|---|---|---|---|
| 8,430,510 B2 | 4/2013 | Sugio | |
| 8,761,439 B1* | 6/2014 | Kumar | G06T 7/73 |
| | | | 382/103 |
| 8,890,896 B1 | 11/2014 | Tseng | |
| 9,024,972 B1* | 5/2015 | Bronder | G06T 19/006 |
| | | | 345/633 |
| 9,025,252 B2 | 5/2015 | Lewis | |
| 9,109,905 B2 | 9/2015 | Hsu | |
| 9,189,858 B2 | 11/2015 | Svanholm | |
| 9,202,280 B2 | 12/2015 | Wu | |
| 9,244,539 B2 | 1/2016 | Venable | |
| 9,274,340 B2 | 3/2016 | Lyons | |
| 9,285,872 B1 | 3/2016 | Raffle | |
| 9,311,718 B2 | 4/2016 | Scavezze | |
| 9,316,833 B2 | 4/2016 | Border | |
| 9,600,067 B2* | 3/2017 | Kumar | G06F 3/012 |
| 10,213,645 B1* | 2/2019 | Wu | A63B 24/0006 |
| 2002/0103617 A1* | 8/2002 | Uchiyama | G06T 7/74 |
| | | | 702/150 |
| 2011/0170067 A1 | 7/2011 | Sato | |
| 2011/0172950 A1* | 7/2011 | Brady | G01C 21/16 |
| | | | 702/141 |
| 2012/0043410 A1* | 2/2012 | Geswender | F42B 15/01 |
| | | | 244/3.2 |
| 2015/0092048 A1 | 4/2015 | Brunner | |
| 2015/0146926 A1 | 5/2015 | Ramachandran | |
| 2015/0201180 A1* | 7/2015 | Mourikis | H04N 13/296 |
| | | | 348/46 |
| 2015/0213778 A1 | 7/2015 | Moravetz | |
| 2015/0241969 A1 | 8/2015 | Elangovan | |
| 2016/0048964 A1 | 2/2016 | Kruglick | |
| 2016/0098095 A1* | 4/2016 | Gonzalez-Banos | G06F 3/017 |
| | | | 345/156 |
| 2017/0102772 A1* | 4/2017 | Hesch | G01S 5/163 |
| 2017/0132794 A1* | 5/2017 | Lee | G06T 7/20 |
| 2017/0220119 A1* | 8/2017 | Potts | G06F 3/017 |
| 2018/0100762 A1* | 4/2018 | Park | G01J 1/0228 |
| 2019/0182415 A1* | 6/2019 | Sivan | H04N 5/23203 |

OTHER PUBLICATIONS

Miniature 6 DOF Inertial System for Tracking HMD's, Eric Foxlin, Michael Harrington and Yury Alshuler, published Apr. 13-14, 1998.
Dual Sensor Filtering for Robust Tracking of Head Mounted Displays, University of Bath, Nov. 4, 2014.
Correcting Drift, Head and Body Misalignments between Virtual and Real Humans, 2013.
Visual Odometry and Mapping for Autonomous Flight Using an RGB-D Camera by Albert S. Huang, Abraham Bachrach, Peter Henry, Michael Krainin, Daniel Maturana, Dieter Fox and Nicholas Roy, published Aug. 28, 2011.
Wear++:3D Model Driven Camera Tracking on Board the Interantional Space Station by D. Tingdahl, D. De Weerdt, M Vergauwen and L. Van Gool, published Dec. 7, 2011.

* cited by examiner

SYSTEMS AND METHODS FOR DRIFT CORRECTION

RELATED APPLICATIONS

This application claims priority to provisional Application Ser. No. 62/290,253, filed on Feb. 2, 2016 which is incorporated by reference herein.

FIELD OF THE INVENTION

An embodiment of the present invention relates generally to portable electronic devices, and in particular, to systems for and methods of correcting drift in an electronic device.

BACKGROUND OF THE INVENTION

Virtual reality devices and other head-mounted display (HMD) devices that do not employ external systems for tracking rely on the sensors in the HMD or device used in the HMD for head orientation tracking. An issue with the current technology in HMD devices is that some sensors may drift over time. For example, current HMD devices suffer from inertial measurement unit (IMU) drift when the HMD device changes temperature, where rotations of the HMD in the real world may not be registered in the virtual world. Conventional techniques to address drift require too much computer power and energy, resulting in a compromised user experience. Examples of a compromised user experience can include reduced resources for rendering, reduced battery life, and increased heat which tends to exacerbate the errors from the IMUs.

Accordingly, devices and methods that correct drift in an electronic device are beneficial.

SUMMARY OF THE INVENTION

In a first embodiment a method includes determining a first center pose of the electronic device. The method also includes tracking, using a sensor in conjunction with computer vision on a processor, at least one key point within a scene when the first center pose is within a tolerance with respect to a reported center pose. The method includes determining derived center pose based upon the first center pose and the at least one key point. The method then includes disabling the sensor for a predetermined time. The method thereafter includes determining, after the predetermined time, whether a second center pose is within a tolerance with respect to the derived center pose. The method may then track, using the sensor, at least one key point when the second center pose is within the tolerance with respect to the derived center pose. The method can then adjust the second center pose when there is a difference between the second center pose and the derived center pose.

In a second embodiment, an electronic device configured to correct for drift includes a processor, a display coupled to the processor to display a scene, and a motion sensor coupled to the processor, wherein the motion sensor determines a first center pose of the electronic device. A camera coupled to the processor camera tracks at least one key point within a scene if the first center pose is within a tolerance with respect to a reported center pose; wherein the processor determines a derived center pose based upon the first center pose and the first key points. The sensor is disabled for a predetermined time. After the predetermined time, it is determined when a second center pose is within the tolerance with respect to the derived center pose. Using the at least one key point, the second center pose is tracked if it is within the tolerance with respect to the derived center pose; and the second center pose is adjusted when there is a difference between the second center pose and the derived center pose.

A third embodiment includes non-transitory computer-readable storage medium having data stored therein representing instructions executable by a processor to perform a method. The method also includes tracking, using a sensor in conjunction with computer vision on a processor, at least one key point within a scene when the first center pose is within a tolerance with respect to a reported center pose. The method includes determining a derived center pose based upon the first center pose and the at least one key point. The method then includes disabling the sensor for a predetermined time. The method thereafter includes determining, after the predetermined time, whether a second center pose is within the tolerance with respect to the derived center pose. The method may then track, using the sensor, the at least one key point when the second center pose is within the tolerance with respect to the derived center pose. The method can then adjust the second center pose when there is a difference between the second center pose and the derived center pose.

Other features will be recognized from consideration of the Detailed Description and the Claims, which follow.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

An embodiment of the invention addresses the "drift" phenomena using computer vision techniques in such a way that the computer vision techniques do not consume too much power and degrade device performance. A known limitation of current computer vision techniques on mobile devices is the large amount of computer power required, thus compromising performance as well as exacerbating the heat issue. An embodiment of the invention employs computer vision techniques such as, for example, monocular simultaneous location and mapping (SLAM) or pattern recognition and tracking using a camera or other sensor of the electronic device. These techniques may be controlled to solve drift without placing excessive burden on the system. In situation where power is continually provided, the invention is still valid and employable by simply setting the reset timer to zero, null or bypass the timer altogether.

Figure 1:
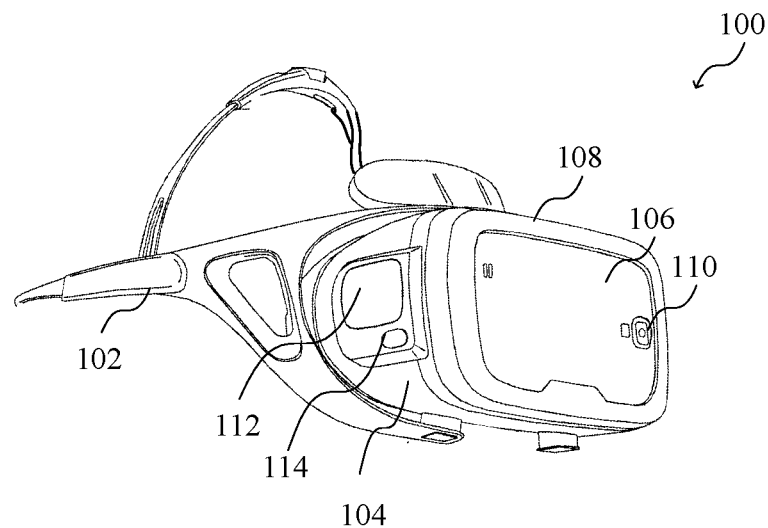
FIG. 1 illustrates an exemplary block diagram of a head-mounted electronic device.

FIG. 1 illustrates an exemplary block diagram of an electronic device, implemented here as a head-mounted electronic device. The head-mounted electronic device 100 of FIG. 1 comprises a head mounting element 102 enabling securing a control unit 104 to a user's head. The head mounting element could include straps, adjustable head bands, or attachment members that enable securing the HMD to a user's head. The control unit 104 is configured to provide a visual experience on a screen viewed by a user wearing the head-mounted electronic device 100. According to some embodiments, some elements of the head-mounted device may be implemented in a portable electronic device 106, such as a display of a smart phone for example. That is, the elements necessary to implement the circuits and methods set forth below can be implemented in a control unit 104 of the head-mounted electronic device, in the portable electronic device 106, or distributed between the control unit 104 of the head-mounted electronic device and the portable electronic device 106. According to other embodiments, the elements associated with the circuits and methods are implemented in the control unit of an integrated head mounted device that does not require a portable electronic device 106.

An attachment element 108 may be used to secure the portable electronic device 106 to the control unit 104. The attachment element 108 may include a connector mechanism (e.g., microUSB, USB type C, lightning connector, etc.). The attachment element may further include a mechanism to hold the portable electronic device to the HMD. Examples of such mechanisms may include clips, clamps, removable covers, etc. The portable electronic device could be for example a smart phone or other type of wireless communication device having a display. A camera 110, which may be a part of the portable electronic device 106, allows the head-mounted electronic device to function as a virtual reality (VR) device or an augmented reality (AR) device using the camera to pass-through images of the surrounding environment. The HMD may also comprise user interface elements, shown here as a track pad 112 and a control button 114, which may enable a selection operation that depends upon the mode of operation of the HMD.

While an electronic device having a display viewable by a user is shown in FIG. 1 as a head-mounted electronic device, it should be understood that the circuits and elements set forth below could be implemented in an electronic device that does not need to be mounted to the head, but can be held in the hand of the user to provide a visual experience, which may be a VR or an AR experience for examples, to a user. Such a device could be a stand-alone device or could have a portable electronic device such as a smartphone.

Figure 2:
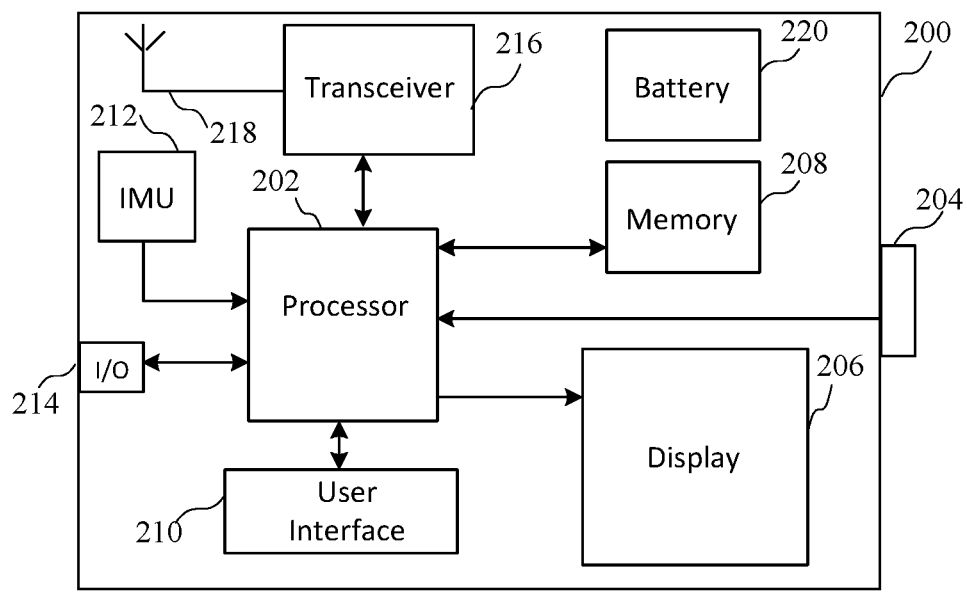
FIG. 2 illustrates an exemplary block diagram of an electronic device.

FIG. 2 illustrates an exemplary block diagram of an electronic device. In particular, a device 200 comprises a processor circuit 202 coupled to an image sensor 204. The processor 202 could be an ARM processor, an X86 processor, a MIPS processor, a graphics processing unit (GPU), a general purpose GPU, or any other processor configured to execute instructions stored in a memory. The processor 202 could be implemented in one or more processing devices, where the processors may be different. For example, the electronic device could include a central processing unit (CPU) as well as a GPU for example. The processor implements an operating system (OS) that accesses software on the memory and receives various inputs, such as readings from the IMU and a sensor, such as a camera for example, to enable the correction for drift as will be described in more detail below. The device 200 could be any type of device, or a component such as an integrated circuit of a device or system, adapted to capture a digital image. The image sensor 204 could be a digital camera, or any portion of a digital camera, such as a lens or other image sensing element. While a single image sensor is shown, it should be understood that multiple sensors and could include any type of sensor that could be used to detect key points in a scene. The processor circuit could be coupled to a display 206 for displaying a captured image, and more particularly, displaying a digital image. The processor circuit, alone or in combination with other elements, can correct drift in an electronic device.

The processor circuit 202 may also be coupled to a memory 208 that enables storing information related to various frames of an image, or resulting digital images associated with an AR or a VR image. The memory 208 could be implemented as a part of the processor circuit 202, or could be implemented in addition to any cache memory of the processor, as is well known. The memory 208 could include any type of memory, such as a solid state drive (SSD), Flash memory, Read Only Memory (ROM) or any other memory element that provides long term memory, where the memory could be any type of internal memory of the electronic drive or external memory accessible by the electronic device. The processor 202 could implement open CV software tools or other suitable software tools stored on the memory and accessible by the processor for enabling computer vision. A user interface 210, which may be separate from the display, or which may be a part of, or responsive to, the display, is also shown. The user interface 210 may comprise both graphical and physical user interface elements, where the graphical user interface may comprise a touch screen display implemented as display 206, which may be used before the HMD is attached to the head. The physical user interface may comprise elements that enable providing data or other information to the electronic device, such as the touchpad 112 and the control button 114, or other elements such as a microphone, a mouse, or a keypad, where the mouse or keypad could be a wired or wireless device for example. The processor circuit 202 may also be coupled to other elements that receive inputs or enable the capturing of a digital image or displaying an AR or VR image. For example, a motion sensor, such as an inertial measurement unit (IMU) 212, can provide various information related to the motion or orientation of the device 200. The IMU 212 could include an accelerometer and a gyroscope for example. The processor circuit 202 may also receive input by way of an input/output (I/O) port 214 or a transceiver 216 coupled to an antenna 218. The I/O port 214 may be any interface element adapted to interface with external physical user interface elements, such as an external keyboard or mouse, by way of a wired or wireless connection for example. A battery 220 may be implemented to provide power to the processor and other elements of the device 200.

Figure 3:
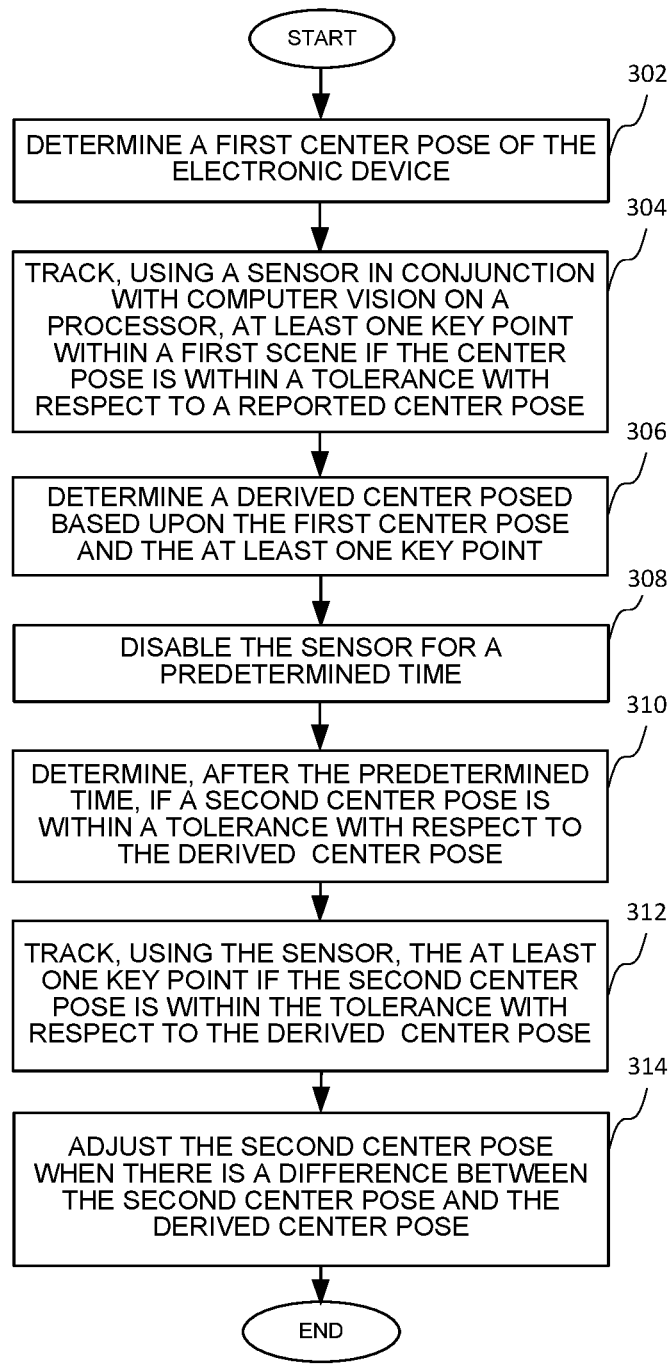
FIG. 3 illustrates an exemplary flow chart showing a method of correcting for drift in an electronic device.

FIG. 3 illustrates an exemplary flow chart showing a method of correcting for drift in an electronic device. A first center pose of the electronic device is determined at block 302. At least one key point is tracked, using computer vision operating on a processor, within a scene if the first center pose is within a tolerance with respect to a reported center pose, which may be an offset tolerance, at block 304. A reported center pose may be determined when an electronic device, such as an HMD for example, is first put on and is based upon where the user's head is facing. The reported center pose is the direction that the OS of the HMD considers to be a front and center orientation. The reported center pose may be reset using a reset feature of the HMD to a position where the HMD is currently facing. Key points may be elements or objects in the image having key values that can be identified. For example, the key points may be identified by the intersection of edges of an object that may form a sharp contrast and can be identified by values associated with the edge values. While a single key point may be used, a plurality of key points can be selected to ensure that the center pose is correctly determined. The number of key points may vary depending upon the scene, where a sufficient number is detected to ensure that a computer vision tool can determine a pose with respect to the selected key points. The computer vision techniques could include SLAM, pattern recognition and tracking, or other computer vision techniques for tracking objects in a scene. The sensor could be a camera, for example, or any other sensor that can detect objects in a scene, such as an infra-red sensor for example.

A derived center pose based upon the first center pose and the at least one key point is determined at block 306. The derived center pose based upon the first center pose and the at least one key point can be determined by establishing that a variation between the first center pose, established by the IMU of the electronic device for example, and the at least one key point established by the sensor employing known computer vision techniques. The derived center pose could be represented by position variance, and more particularly an offset angle measurement using the first center pose and the at least one key point. The sensor may then be disabled for a predetermined time at block 308. It is then determined, after the predetermined time, if a second center pose is within a tolerance with respect to the derived center pose at block 310. This determination could be based upon an IMU measurement for example. The at least one key point is tracked, using computer vision, when the second center pose is within the tolerance with respect to the derived center pose at block 312. The second center pose is adjusted if there is a difference between the second center pose and the derived center pose at block 314. The second center pose can be gradually adjusted by a certain degree increment until the second center pose is within the tolerance. For example, if it is determined that the second center pose has a 5 degree offset from the at least one key point (based upon a comparison of the IMU measurement and the location of the at least one key point by the camera), the center pose associated with the IMU is sequentially adjusted by 0.5 degrees until the center pose determined by the IMU is within the tolerance. While any degree increment may be utilized, smaller increments may be used to reduce a noticeable disconnect by the user. Whenever the center pose determined by the IMU is not within the tolerance, the center pose will be corrected until it is within the offset threshold as long as the stored visual key points are matched. Once the center pose is within the tolerance, the camera is turned off for the timeout period.

Figure 4:
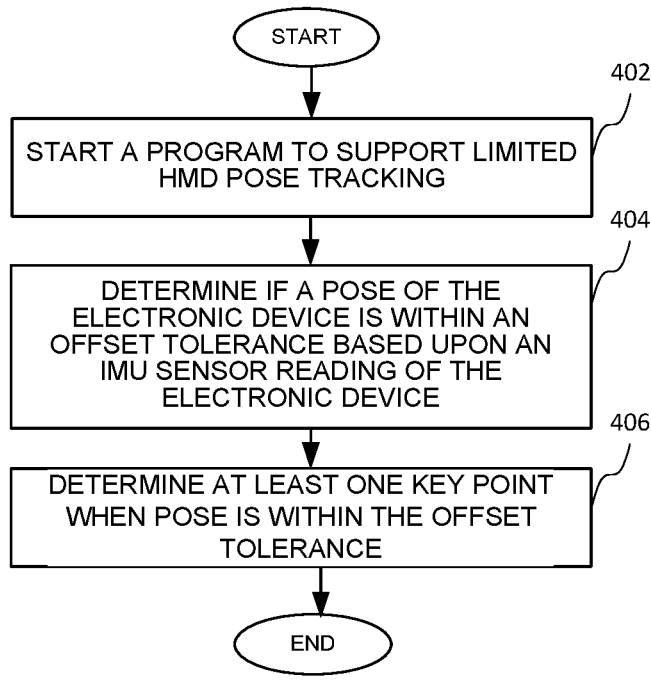
FIG. 4 illustrates an exemplary flow chart showing a method of determining if an HMD pose is within an offset tolerance.

FIG. 4 illustrates an exemplary flow chart showing a method of determining if an HMD pose is within an offset tolerance value, which may be performed at block 302 of FIG. 3. A program to support HMD pose tracking is started at block 402. The program could be initiated automatically by the device, or could be a request initiated by the user. It is then determined if a pose of the electronic device is within an offset tolerance at block 404. This determination could be based upon a reading of an IMU of the electronic device. The at least one key point is then determined when the pose is within the offset tolerance at block 406. That is, an electronic device implementing a program to support HMD pose tracking will wait until the HMD pose is within an offset tolerance before continuing the pose tracking. If the at least one key point determined in any subsequent pose process was determined when the HMD is not within an offset tolerance of the HMD front and center pose, any selected key points may not be generally near the center when the HMD returns to a front and center pose. The exemplary flow chart of FIG. 4 may be implemented according to block 701 of FIG. 7 along with other elements of FIG. 7.

Figure 5:
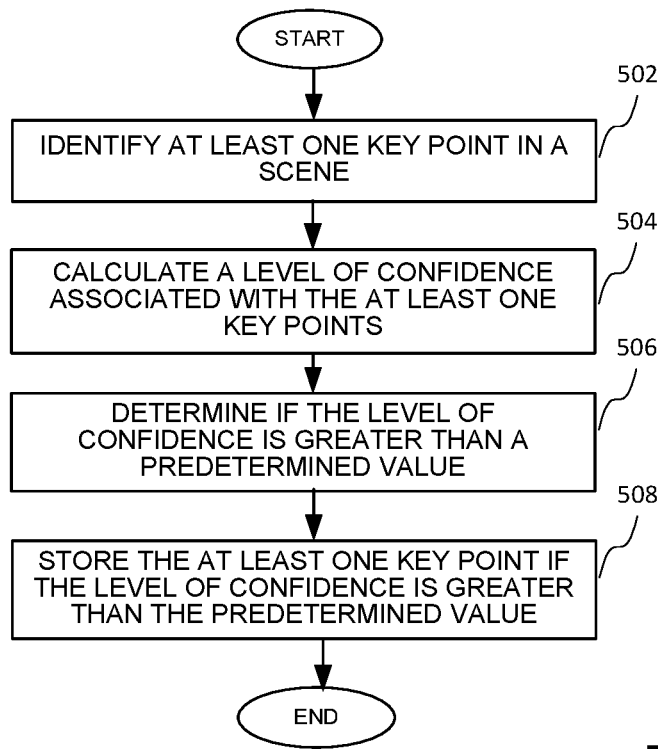
FIG. 5 illustrates an exemplary flow chart showing a method of finding visual key points in a scene.

FIG. 5 illustrates an exemplary flow chart showing a method of finding visual key points in a scene, which may be performed at block 304 of FIG. 3. At least one key point in a scene is identified at block 502. A level of confidence associated with one or more key points are calculated at block 504. A level of confidence could be determined by repeating steps of identifying key points in a scene, for example. The at least one key point could be checked multiple times and if the key points appears in substantially the same place within the scene, the at least one key point would be stored. For example, a level of confidence could be calculated based upon points that are captured by a camera of the electronic device and appear in the same location in a predetermined number of images captured by the camera. It is then determined if the level of confidence is greater than a predetermined value at block 506. A level of confidence could be greater than a determined value if a variation in the at least one key point is less than some value, such as maximum distance between key points in any of the images or an average distance between key points in the plurality of captured images. The at least one key point is stored if the at least one key point satisfies predetermined storage criteria at block 508. The method of FIG. 5 could be implemented in block 705 of FIG. 7.

Figure 6:
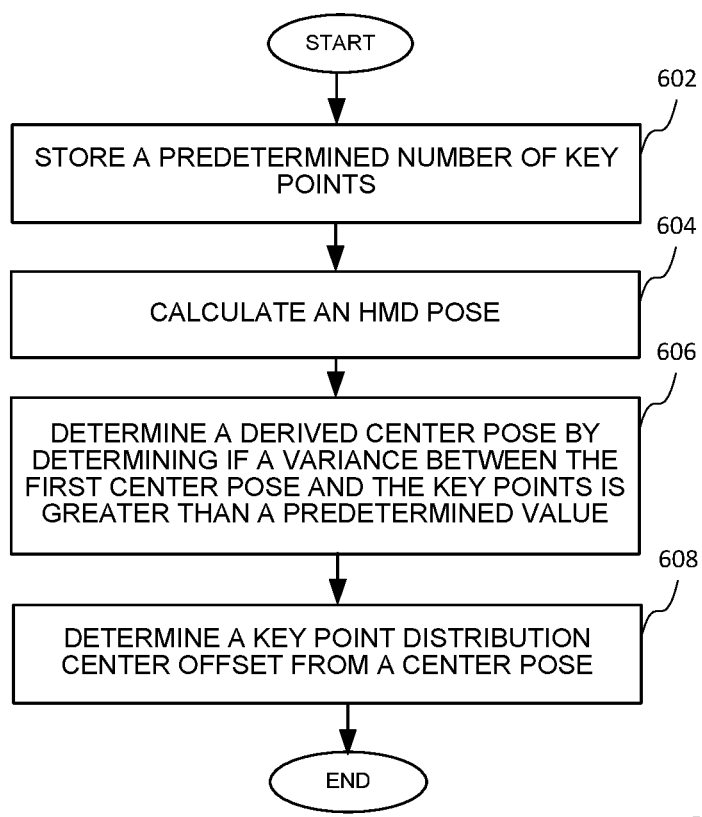
FIG. 6 illustrates an exemplary flow chart showing determining key point distribution.

FIG. 6 illustrates an exemplary flow chart showing determining key point distribution. A predetermined number of key points is stored at block 602. An HMD pose is calculated at block 604. A derived center pose based upon the HMD pose and the at least one key point is determined by evaluating whether a position variance between the HMD pose and the at least one key point is greater than a predetermined value at block 606. A key point distribution center offset from a center pose is determined at block 608. The distribution of key points can affect whether a sensor can determine when an offset of the pose established by the IMU has exceeded an offset threshold. That is, if the key points are more widely distributed, it is more likely that the key points can be identified after the camera is turned on and then used to correct the pose, as will be described in reference to FIG. 7. In contrast, if the key points are too close together, it may be difficult to determine an offset.

Figure 7:
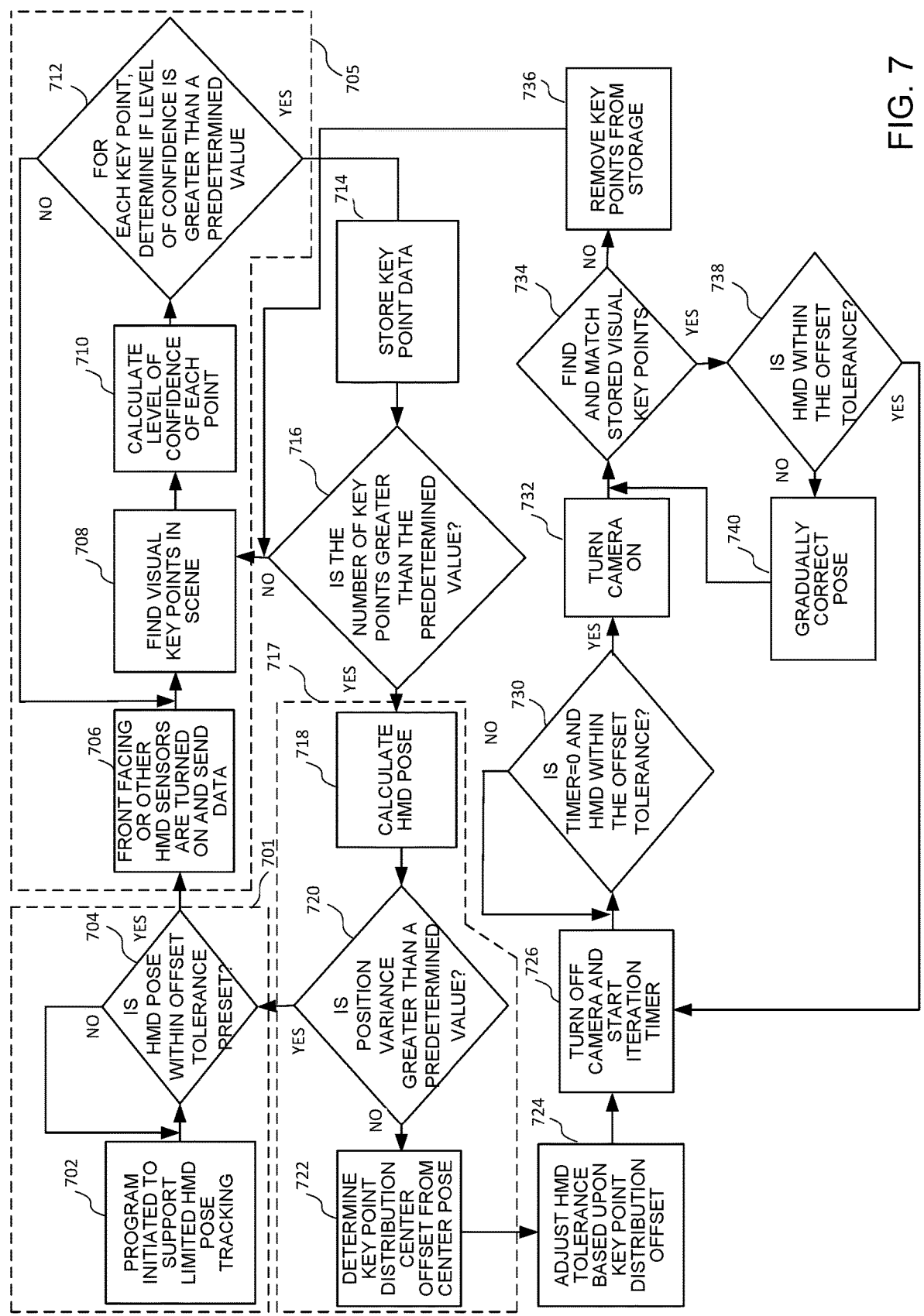
FIG. 7 illustrates an exemplary flow chart showing another method of correcting for drift in an electronic device.

FIG. 7 illustrates an exemplary flow chart showing another method of correcting for drift in an electronic device. It is initially determined if an HMD pose is within an offset tolerance value at block 701, where a program is initiated at block 702 to support limited pose tracking. Pose tracking according to the implementation of FIG. 7 can reduce power used by an electronic device by selectively turning off a sensor, such as a camera and the required computer processing of data from the camera, that is used to determine if a pose determined by an IMU of the electronic device has drifted, which may be caused by the electronic device changing temperature or other abnormality. The program may be initiated automatically or in response to a user. In one embodiment, the computer vision techniques used for drift correction can be turned on by default from the operating system (OS) of the electronic device, initiated by an app, or initiated by the user (e.g., initiated when the user puts the device in airplane mode or movie mode). Once the program is initialized, a reported center pose is provided by the OS. This reported center pose is the HMD pose center when a user of the HMD is looking straight ahead. It is then determined if the HMD pose is within an offset tolerance at block 704. For example, it may be determined whether a center pose is within a tolerance with respect to the reported center pose. If not, the system waits until the HMD pose is within an offset tolerance. That is, the system waits until the user looks straight forward again. If the HMD pose is within the offset tolerance, front facing sensors, such as a camera or other HMD sensors, are turned on to measure and track the scene in front of the user and send data at block 706. This measuring and tracking can be overridden by the OS, an App or a user to define a new HMD Pose center.

At least one visual key point is then found in a scene at block 708. Using computer vision techniques, for example, the at least one key point can be discovered and tracked within the scene. The key points can be, for example, edges of an object within the scene. A level of confidence may optionally be found for each key point in the scene at block 710. It may then be optionally determined, for each key point, if the level of confidence is greater than a predetermined value at block 712. If the level of confidence does not meet the predetermined threshold, the search for visual key points may be repeated through block 708. Once enough key points have been tracked at a high enough level of confidence and are not inconsistent with IMU data, the key points are stored (e.g., the scene and the location of the key point can be stored in a database). The level of confidence can be considered high, for example, when the key points are checked multiple times (e.g., 100 times) and the key points appear in substantially the same place. By way of example, the IMU data and the key points can be considered consistent when the IMU data indicates that there was no head movement (within tolerance) and the key points are in substantially the same place (within tolerance). If the data is consistent, the key points and related data is stored at block 714 and the initialization process is completed.

It is then determined if the number of key points is greater than a predetermined value at block 716. If the number of key points is not greater that a predetermined value, the process may return to block 708 to find additional visual key points in the scene. The predetermined value may be any number of key points sufficient for the computer vision tool to determine the correspondence between a calculated HMD pose and the one or more key points. If so, the process may proceed to determining key point distribution at block 717. Within block 717, the HMD pose is calculated at block 718. The process may then determine whether a position variance is greater than a predetermined value at block 720. That is, the determination of whether the position variance is greater that a predetermined threshold provides another check using the one or more key points to make sure that the head of the user wearing the HMD has not turned before the camera is turned off in order to later provide another visual check when the camera is turned on. If so, the process may return to block 704 to recalibrate the HMD pose and one or more key points. In doing so, any of the previously stored one or more key points are removed from storage and no longer kept. If the position variance is within the threshold indicated by the predetermined value, the process may proceed to determining a key point distribution center offset from a center pose at optional block 722. At block 722, the center of all key points may be calculated. The distance of this center (x, y) from the HMD pose center may then be added to the HMD pose center (x, y). The HMD offset tolerance may also then be optionally adjusted based upon a key point distribution offset at block 724. For example, the mean distance of all the tracked key points from the center could be calculated. The larger the value of this offset, the more the offset tolerance of the HMD pose center offset is increased. In other words, the mean distribution of the tracked key points indicates how much the HMD can be moved and still have enough key points in the view to determine if drift occurred.

The process may then deactivate the camera and activate a timer at block 726. The timer may have a preset duration. For example, the timer may be a countdown timer set for approximately 30 seconds. Once the preset duration passes (e.g., the timer counts down to zero), a drift check can be initiated at block 730, where the one or more key points are used to determine whether any drift has occurred during the interval. If the conditions are not fulfilled at block 730, the system will wait until the HMD is within the offset tolerance. The duration of the countdown timer may change as necessary to accommodate changes in the drift. For example, an IMU may not drift as much over time as the electronic device stabilizes, enabling the duration of the time between checks to increase. If determined by the user or app, for example if constant power is applied, the timer duration can be set to zero or the processed bypassed to support constant drift correction.

When the predetermined time has elapsed and the HMD is within the offset tolerance, the process may proceed to block 732 to turn on the camera and load the one or more stored key points. It is then determined if stored visual key points are found and matched at block 734. If one or more key points is missing and cannot be found, the one or more key points are removed from storage at block 736, and the process returns to determining one or more key points from the scene at block 708. An example of such a situation may occur when an object in the physical surrounding environment associated with a key point is moved or removed (e.g., a key point is associated with a chair). If the stored visual key points are found and matched, it is determined whether a pose error associated with a second pose is greater than the offset tolerance at block 738. For example, using the same computer vision techniques, the current OS provided HMD center pose using an IMU is tested against the calculated center pose based off the computer vision techniques resulting in an error value (or drift). Based on a preset degree amount and preset number of frames, the HMD OS center pose is adjusted to match the calculated center pose. If the pose error is within the offset tolerance, the process returns to block 726 where the camera is deactivated and the iteration timer is restarted. Otherwise, the pose is gradually corrected based upon the offset tolerance at block 740 as described in block 314 of FIG. 3 or below, and it is again determined whether stored visual key points are found and matched at block 734.

The error may be constantly recalculated until the error is below a preset tolerance. For example, if the error (or drift) is 3°, then the drift can be slowly adjusted by 0.5° until the drift is corrected. At this point, the camera is turned off and the timer is restarted. It should be noted that any time that there is an error greater than the offset tolerance, the error would be corrected if the visual key points are matched. If during the visual key point rediscovery step, an insufficient number of key frames is found, the key frame data is removed from storage at block 736 and the process of finding one or more new key points is restarted. It should be noted that the methods of FIGS. 3-7 could be implemented using a computer accessing a non-transitory computer-readable storage medium having data stored therein.

It can therefore be appreciated that new devices for and methods of providing drift correction through computer vision techniques have been described. It will be appreciated by those skilled in the art that numerous alternatives and equivalents will be seen to exist that incorporate the disclosed invention. As a result, the invention is not to be limited by the foregoing embodiments, but only by the following claims.

I claim:

1. A method to correct for drift in an electronic device, comprising:
   determining a first center pose of the electronic device;
   tracking, using a sensor in conjunction with computer vision operating on a processor, at least one key point within a scene when the first center pose is within an offset tolerance with respect to a reported center pose;
   determining a derived center pose based upon the first center pose and the at least one key point;
   determining a distribution of key points with respect to the derived center pose;
   adjusting the offset tolerance for the electronic device based upon the distribution of key points with respect to the derived center pose, wherein an adjusted offset tolerance is selected to include at least some key points of the distribution of key points in the scene to determine drift;
   disabling the sensor for a predetermined time greater than zero by turning off the sensor;
   determining a second center pose after the predetermined time;
   determining whether the second center pose is within the adjusted offset tolerance with respect to the derived center pose;
   turning on the sensor when the second center pose is within the adjusted offset tolerance;
   tracking, using the sensor, the at least one key point when the second center pose is within the adjusted offset tolerance with respect to the derived center pose; and
   adjusting the second center pose using the tracked at least one key point when there is a difference between the second center pose and the derived center pose.

2. The method of claim 1 wherein determining the first center pose comprises determining whether a pose of the electronic device is within the offset tolerance based on an IMU sensor reading of the electronic device.

3. The method of claim 1 wherein tracking the at least one key point within the scene comprises finding at least one key point in the scene and calculating a level of confidence for each key point.

4. The method of claim 3 wherein calculating the level of confidence comprises determining whether the level of confidence is greater than a predetermined value.

5. The method of claim 1 further comprising storing the at least one key point when the at least one key point is checked multiple times and the at least one key point appears in substantially the same place within the scene across the multiple checks.

6. The method of claim 1 wherein determining a derived center pose comprises determining a position variance between the first center pose and the at least one key point.

7. The method of claim 3 wherein tracking the at least one key point comprises identifying edges of an object within the scene.

8. An electronic device, comprising:
a processor;
a display coupled to the processor;
a motion sensor coupled to the processor, wherein the motion sensor determines a first center pose of the electronic device;
a camera coupled to the processor, wherein the camera enables tracking at least one key point within a scene if the first center pose is within an offset tolerance with respect to a reported center pose;
wherein the processor determines a derived center pose based upon the first center pose and the at least one key point; determines a distribution of key points with respect to the derived center pose; adjusts the offset tolerance for the electronic device based upon the distribution of key points with respect to the derived center pose, wherein an adjusted offset tolerance is selected to include at least some key points of the distribution of key points in the scene to determine drift; disables the camera for a predetermined time greater than zero by turning off the camera; determines a second center pose after the predetermined time; determines whether the second center pose is within the adjusted offset tolerance with respect to the derived center pose; turns on the camera when the second center pose is within the adjusted offset tolerance; tracks, using the camera, the at least one key point within the scene when the second center pose is within the adjusted offset tolerance with respect to the derived center pose; and adjusts the second center pose using the tracked at least one key point when there is a difference between the second center pose and the derived center pose.

9. The electronic device of claim 8 wherein the processor determines the first center pose if a pose of the electronic device is within the offset tolerance based upon an IMU sensor reading of the electronic device.

10. The electronic device of claim 8 wherein tracking the at least one key point within a scene by the processor comprises finding the at least one key point in a scene and calculating a level of confidence for each key point.

11. The electronic device of claim 10 wherein tracking the at least one key point within a scene by the processor comprises determining if the level of confidence is greater that a predetermined value.

12. The electronic device of claim 8 further comprising a memory storing the at least one key point if the at least one key point is checked multiple times and the at least one key point appears in substantially the same place within the scene.

13. The electronic device of claim 8 wherein determining a derived center pose comprises determining a position variance between the first center pose and the at least one key point.

14. The electronic device of claim 8 wherein tracking the at least one key point by the processor comprises identifying edges of an object within the scene.

15. The electronic device of claim 8, wherein the electronic device comprises a head-mounted device.

16. A non-transitory computer-readable storage medium having data stored therein representing instructions executable by a processor to perform a method comprising:
determining a first center pose of an electronic device;
tracking, using a sensor in conjunction with computer vision operating on a processor, at least one key point within a scene when the first center pose is within an offset tolerance with respect to a reported center pose;
determining a derived center pose based upon the first center pose and the at least one key point;
determining a distribution of key points with respect to the derived center pose;
adjusting the offset tolerance for the electronic device based upon the distribution of key points with respect to the derived center pose, wherein an adjusted offset tolerance is selected to include at least some key points of the distribution of key points in the scene to determine drift;
disabling the sensor for a predetermined time greater than zero by turning off the sensor;
determining a second center pose after the predetermined period of time;
determining whether the second center pose is within the adjusted offset tolerance with respect to the derived center pose;
turning on the sensor when the second center pose is within the adjusted offset tolerance;
tracking, using the sensor, the at least one key point when the second center pose is within the adjusted offset tolerance with respect to the derived center pose; and
adjusting the second center pose using the tracked at least one key point when there is a difference between the second center pose and the derived center pose.

17. The non-transitory computer-readable storage medium of claim 16 wherein determining the first center pose comprises determining if a pose of the electronic device is within the offset tolerance based upon an IMU sensor reading of the electronic device.

18. The non-transitory computer-readable storage medium of claim 16 wherein tracking the at least one key point within the scene comprises finding key values in the scene and calculating a level of confidence.

19. The non-transitory computer-readable storage medium of claim 18 wherein tracking at least one key point within the scene comprises determining whether the level of confidence is greater that a predetermined value.

20. The non-transitory computer-readable storage medium of claim 16 further comprising storing the at least one key point when the at least one key point is checked multiple times and the at least one key point appears in substantially the same place within the scene.

21. The non-transitory computer-readable storage medium of claim 16 wherein determining a derived center pose comprises determining a position variance between the first center pose and the at least one key point.

22. The method of claim 1 wherein the adjusted offset tolerance is selected to include enough key points of the distribution of key points in the scene to determine if drift has occurred.

23. The method of claim 1 wherein the adjusted offset tolerance is selected based upon a mean distance of the key points of the distribution of key points from a center of the key points of the distribution of key points.

24. The electronic device of claim 8 wherein the adjusted offset tolerance is selected to include enough key points in the scene to determine if drift has occurred.

25. The non-transitory computer-readable storage medium of claim 16 wherein the adjusted offset tolerance is selected to include enough key points in the scene to determine if drift has occurred.

* * * * *